(12) United States Patent  
Morikawa

(10) Patent No.: US 11,952,191 B2
(45) Date of Patent: Apr. 9, 2024

(54) ELECTRONIC COMPONENT CONVEYING TAPE AND ELECTRONIC COMPONENT CONVEYING REEL

(71) Applicant: Murata Manufacturing Co., Ltd., Nagaokakyo (JP)

(72) Inventor: Katsushi Morikawa, Nagaokakyo (JP)

(73) Assignee: MURATA MANUFACTURING CO., LTD., Kyoto (JP)

(*) Notice: Subject to any disclaimer, the term of this patent is extended or adjusted under 35 U.S.C. 154(b) by 281 days.

(21) Appl. No.: 17/684,558

(22) Filed: Mar. 2, 2022

(65) Prior Publication Data
US 2022/0289446 A1    Sep. 15, 2022

(30) Foreign Application Priority Data
Mar. 12, 2021  (JP) .................. 2021-040589

(51) Int. Cl.
*B65D 73/02* (2006.01)
*B65B 15/04* (2006.01)
*H01G 4/30* (2006.01)

(52) U.S. Cl.
CPC .............. *B65D 73/02* (2013.01); *B65B 15/04* (2013.01); *H01G 4/30* (2013.01)

(58) Field of Classification Search
None
See application file for complete search history.

(56) References Cited

U.S. PATENT DOCUMENTS
6,101,790 A    8/2000  Mori et al.

FOREIGN PATENT DOCUMENTS

| EP | 3805129 A1 | 4/2021 |
|---|---|---|
| JP | H0732453 Y2 | 7/1995 |
| JP | H1191711 A | 4/1999 |
| JP | 2003175966 A | 6/2003 |
| JP | 2011-001081 A | 1/2011 |
| JP | 2016124618 A | 7/2016 |
| KR | 1020200139248 A | 12/2020 |

OTHER PUBLICATIONS

Office Action in KR10-2022-0026619, dated Jun. 30, 2023, 6 pages.
Office Action in JP2021-040589, dated Aug. 15, 2023, 3 pages.
Office Action in CN202210228066.0, dated Sep. 21, 2023, 9 pages.

*Primary Examiner* — Alexander S Thomas
(74) *Attorney, Agent, or Firm* — Keating & Bennett, LLP

(57) ABSTRACT

An electronic component conveying tape includes an elongated carrier tape including recessed storage portions at regular intervals in a length direction, and each storing an electronic component, and an elongated cover tape attached to one surface in a thickness direction of the carrier tape to cover openings of the storage portions. The carrier tape is made of paper, and fibers included in the carrier tape are sloped toward the thickness direction relative to the length direction.

20 Claims, 5 Drawing Sheets

ELECTRONIC COMPONENT CONVEYING TAPE AND ELECTRONIC COMPONENT CONVEYING REEL

CROSS REFERENCE TO RELATED APPLICATIONS

This application claims the benefit of priority to Japanese Patent Application No. 2021-040589 filed on Mar. 12, 2021. The entire contents of this application are hereby incorporated herein by reference.

BACKGROUND OF THE INVENTION

1. Field of the Invention

The present invention relates to an electronic component conveying tape and an electronic component conveying reel.

2. Description of the Related Art

When transporting minute electronic components such as multilayer ceramic capacitors, an electronic component conveying tape is used. The electronic component conveying tape includes an elongated carrier tape storing a large number of electronic components stored thereon, and a cover tape that covers the elongated carrier tape thereon. The electronic component conveying tape is wound around the reel, and is transported via the reel (see, for example, Japanese Unexamined Patent Application, Publication No. 2011-001081).

When mounting the electronic component, the electronic component conveying tape is pulled out from the reel, and the cover tape is peeled off from the carrier tape, such that the electronic components are taken out. Here, if the carrier tape is made of paper, when the cover tape is peeled from the carrier tape, there are cases where the fibers on the surface of the carrier tape adhere to the cover tape, and are peeled off. The fibers on the surface adhering to the cover tape do not break halfway, and as the cover tape peels off, surface layer peeling occurs, and the carrier tape becomes unusable.

SUMMARY OF THE INVENTION

Preferred embodiments of the present invention provide electronic component conveying tapes and electronic component conveying reels in each of which adhesion of fibers on a surface of a carrier tape to a cover tape is reduced or prevented.

A preferred embodiment of the present invention provides an electronic component conveying tape including an elongated carrier tape including a plurality of recessed storage portions at regular intervals in a length direction, and each storing an electronic component, and an elongated cover tape attached to one surface in a thickness direction of the carrier tape to cover openings of the plurality of storage portions, the carrier tape being made of paper, and fibers included in the carrier tape are sloped towards the thickness direction relative to the length direction.

According to preferred embodiments of the present invention, it is possible to provide electronic component conveying tapes and electronic component conveying reels in each of which adhesion of fibers on a surface of a carrier tape to a cover tape is reduced or prevented.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
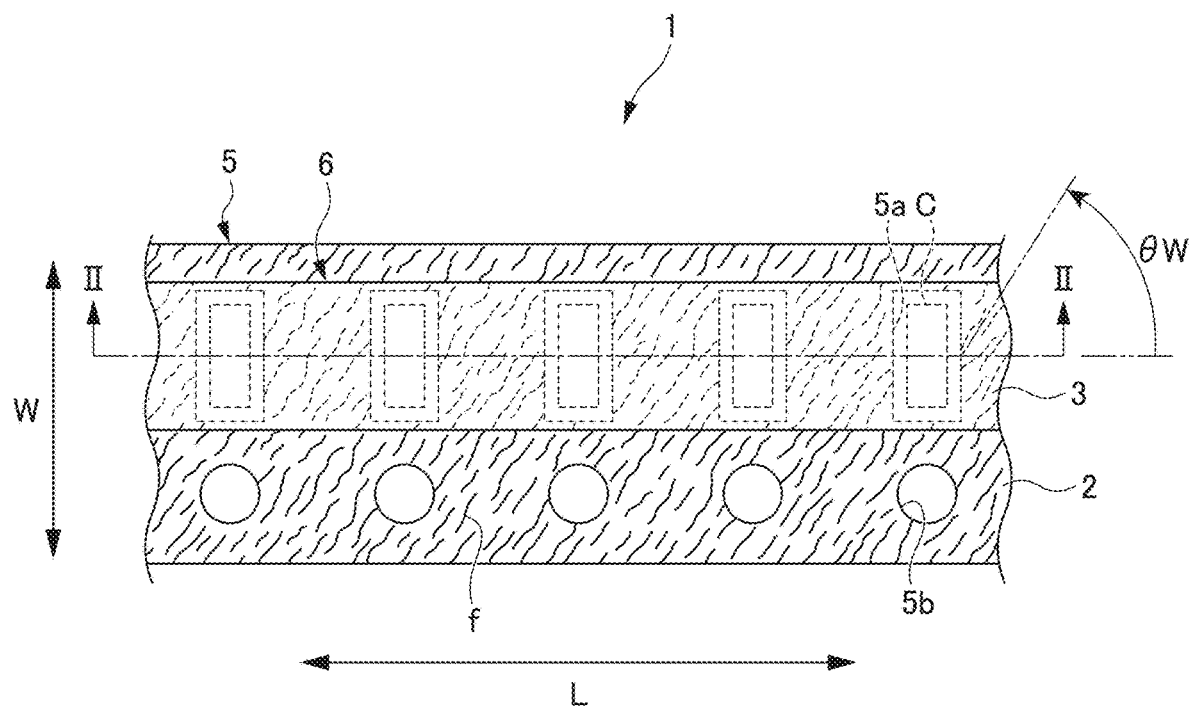
FIG. 1 is a plan view showing an electronic component conveying tape 1 according to a preferred embodiment of the present invention.
Figure 2:
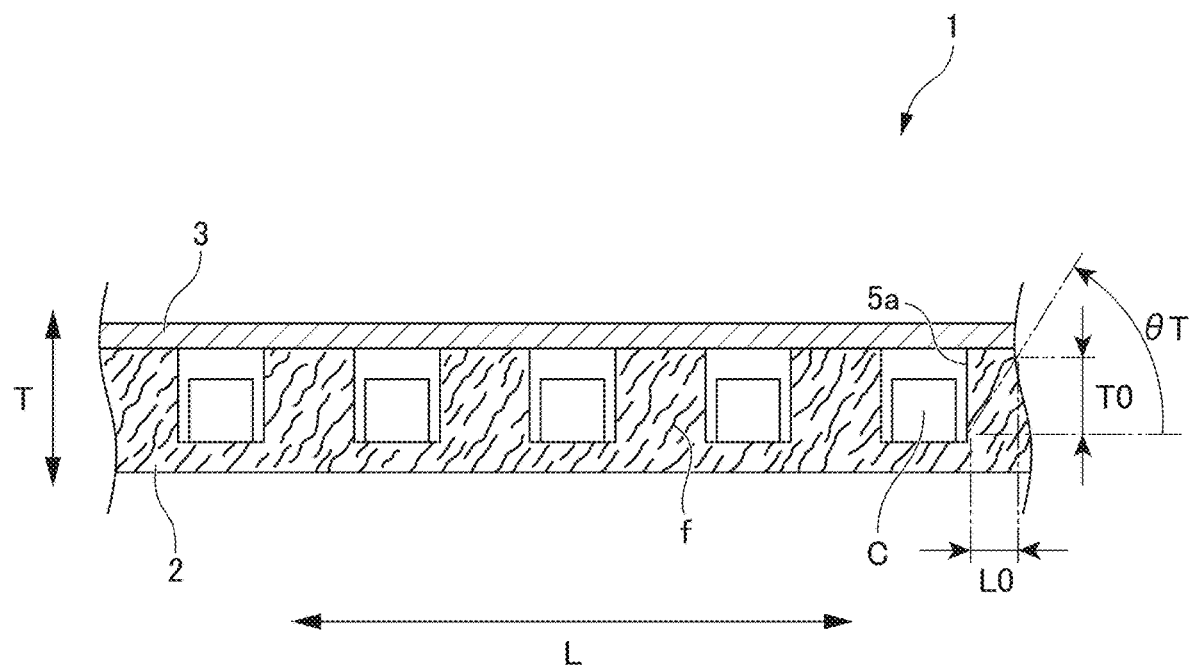
FIG. 2 is a cross-sectional view along the line II-II of the electronic component conveying tape 1 shown in FIG. 1.

Hereinafter, preferred embodiments of the present invention will be described. FIG. 1 is a plan view showing an electronic component conveying tape 1 according to a preferred embodiment of the present invention, and FIG. 2 is a cross-sectional view along the line II-II of the electronic component conveying tape 1 shown in FIG. 1. As shown in FIGS. 1 and 2, the electronic component conveying tape 1 includes a carrier tape 2, and a cover tape 3.

Carrier Tape 2

The carrier tape 2 is an elongated or belt-shaped member.

The carrier tape 2 includes a plurality of storage portions 5a and a plurality of feed holes 5b provided in a line at regular intervals in the length direction L.

The storage portions 5a each include a rectangular or substantially rectangular recess in a plan view in the carrier tape 2. The rectangular or substantially rectangular recess is open toward the surface where the cover tape 3 in the thickness direction T is adhered. One electronic component C is accommodated in each storage portion 5a. The electronic component C is, for example, a multilayer ceramic capacitor.

The dimensions of the recesses are, for example, about 0.665±0.03 mm in the length direction, about 0.335±0.03 mm in the width direction, and about 0.335±0.03 mm in the depth direction.

The feed holes 5b are each a circular or substantially circular through hole penetrating the carrier tape 2. The feed holes 5b are aligned in a row at regular intervals in the length direction L on one side in the width direction W of the carrier tape 2. The feed holes 5b each engage with a tooth 15a of a conveying sprocket 15, which will be described later. The carrier tape 2 is made of paper, and includes a plurality of fibers f. The fiber f will be described later.

Cover Tape 3

The cover tape 3 is an elongated or belt-shaped member.

The cover tape 3 is made of, for example, a transparent resin, and has a function of bonding one side by heat. The cover tape 3 is adhered to the carrier tape 2 in a state in which the adhesive surface is in close contact with the surface of the carrier tape 2 to cover each storage portion 5a, but the feed holes 5b are not closed. As a result, the electronic component C is stored in a state of being enclosed in the portion 5a.

The material of the cover tape 3 is not particularly limited, and a resin is often used.

The electronic component conveying tape 1 in which a plurality of electronic components C are stored is wound around a core member 9a of a reel 9 in a state in which the surface where the cover tape 3 is adhered corresponds to the inner peripheral side. The electronic component conveying tape 1 is transported by the reel 9.

Figure 3:
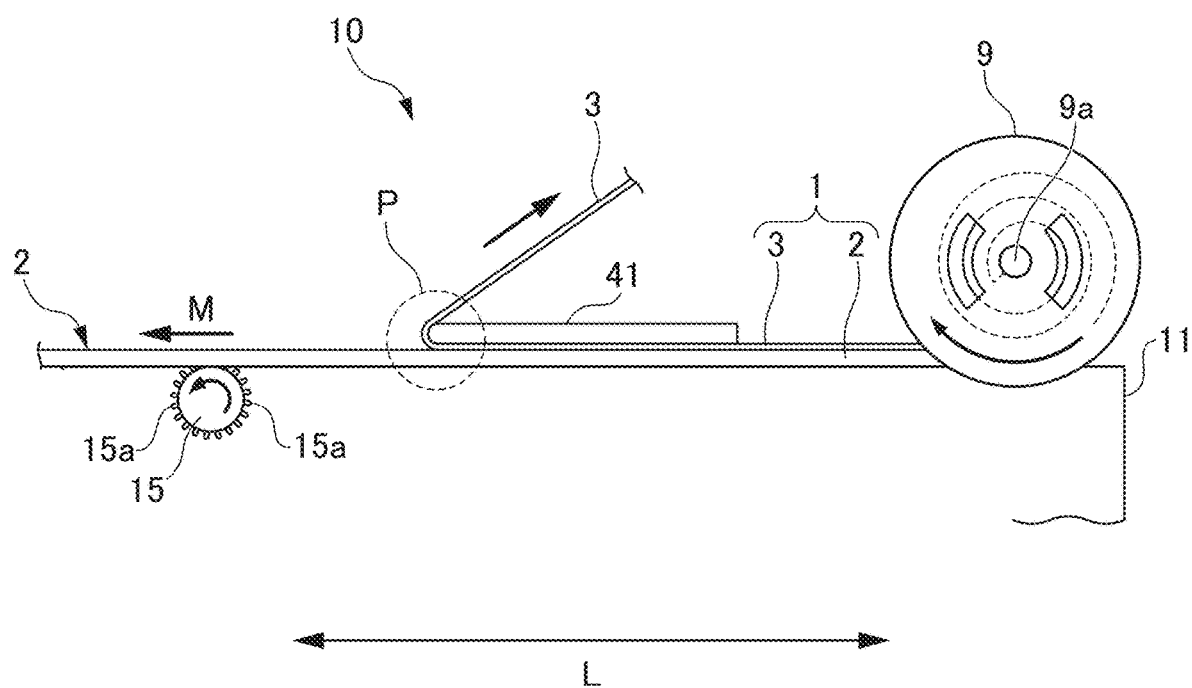
FIG. 3 is a diagram showing an example of a peeling device 10 that peels a cover tape 3 by unwinding the electronic component conveying tape 1 from a reel 9.

FIG. 3 is a diagram showing an example of a peeling device 10 that peels the cover tape 3 by unwinding (feeding) the electronic component conveying tape 1 from the reel 9 where the electronic component conveying tape 1 is wound on the core member 9a.

When mounting the electronic component C on a board, for example, the electronic component conveying tape 1 is fed out from the reel 9, and the cover tape 3 is peeled off by the peeling device 10. The peeling device 10 includes a conveying table 11, a conveying sprocket 15, and a holding plate 41. The conveying table 11 holds the reel 9 around which the electronic component conveying tape 1 is wound at one end, and the conveying sprocket 15 provided on the other end.

The conveying sprocket 15 includes a plurality of teeth 15a which engage the feed holes 5b of the carrier tape 2 on the outer peripheral portion, and is driven to rotate by a motor (not shown).

The feed holes 5b of the carrier tape 2 are successively engaged with the plurality of teeth 15a of the conveying sprocket 15 to be rotated, such that the electronic component conveying tape 1 is transported in the conveying direction in a state in which the surface on which the cover tape 3 is attached faces upward.

When the electronic component conveying tape 1 is fed from the reel, the electronic component conveying tape 1 is held by the holding plate 41 in a state in which the cover tape 3 is adhered on the carrier tape 2. Furthermore, only the cover tape 3 is pulled obliquely upward by a pulling device (not shown) on the distal end side of the holding plate 41 in the traveling direction. Then, the cover tape 3 is peeled off from the carrier tape 2, and only the carrier tape 2 that holds the electronic component C is fed in the traveling direction. This allows the storage portion of the electronic component C to be opened such that it is possible to take out the electronic component C.

The electronic components are taken out one by one from the storage portions 5a of the carrier tape 2, and mounted on a mounting board or the like.

Thickness Direction Orientation Degree θT

The carrier tape 2 of the present preferred embodiment is made of paper, and is an aggregate of a plurality of fibers f.

Here, in a plan view when viewed from a plane passing through the thickness direction T and the length direction L of the carrier tape 2, when the angle along the length direction L is defined as 0°, the slope towards the thickness direction T of the fibers f is defined as the thickness direction orientation degree θT.

The fibers f in the carrier tape 2 include many fibers f sloped at the thickness direction orientation degree θT, which is smaller than about 90°. The direction of the slope of the fibers f corresponds to the direction in which the rear end side of the feeding direction M of the electronic component conveying tape 1 approaches the cover tape 3 of the carrier tape 2.

More specifically, in a plan view seen from the direction shown in FIG. 2, the fibers f having the thickness direction orientation degree θT of, for example, about 20° to about 70° is about 70% or more of the entire fibers f. Furthermore, in the plan view shown in FIG. 2, the average of the thickness direction orientation degree θT of the entire fibers f is, for example, about 0° to about 45°.

The thickness direction orientation degree θT of the fibers f can be measured by, for example, performing CT scanning on the carrier tape 2 from a plane passing through the thickness direction T and the length direction L as shown in FIG. 2, obtaining a CT image, and measuring the thickness direction orientation degree of the fibers f extracted from the CT image.

The thickness direction orientation degree θT can also be represented by the ratio (T0/L0) of the length T0 projecting in the thickness direction T of the fibers f to the length L0 projecting in the length direction L. The expression is tan θ=T0/L0. In addition, it is not necessary for all of the fibers to be oriented in the same direction, and it is preferable that, for example, about 70% or more of the fibers imaged fall within the above angle.

Figure 4:
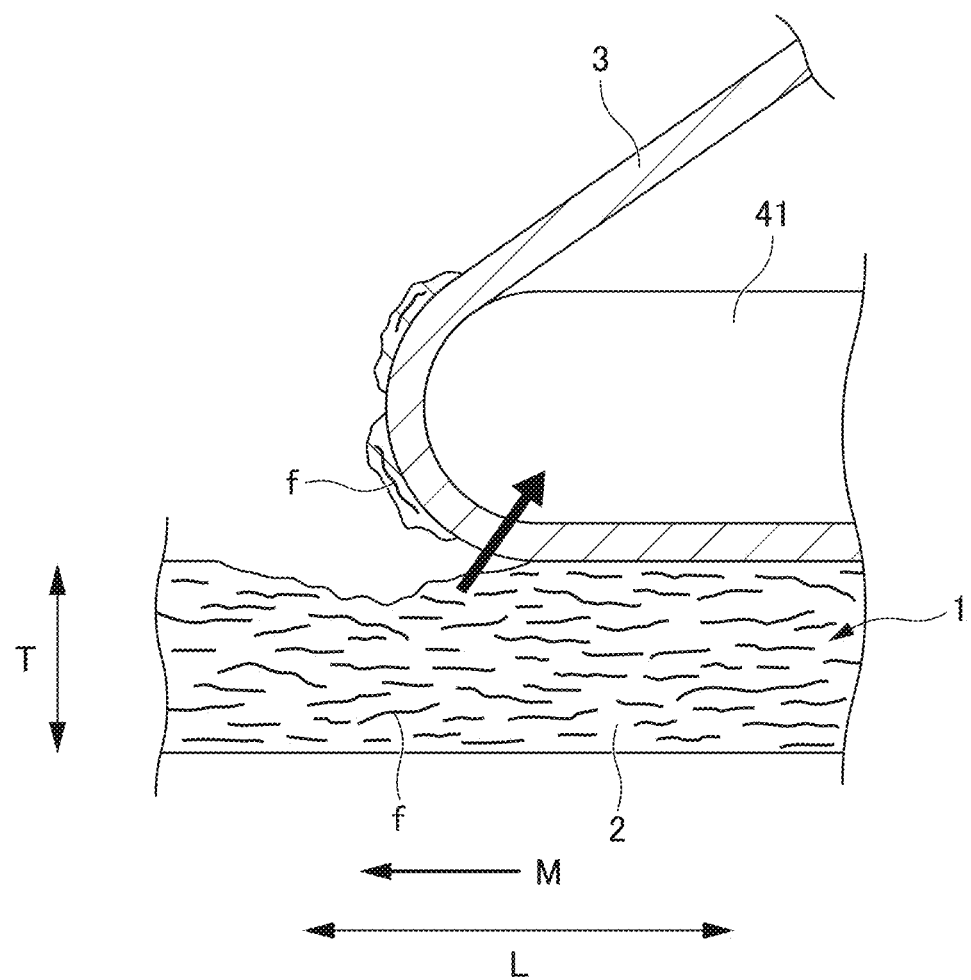
FIG. 4 is an enlarged view of a P portion of FIG. 3 in a comparative example.

FIG. 4 is an enlarged view of the P portion of FIG. 3 in a comparative example. In the comparative example, the same reference numerals as those in the present preferred embodiment are used.

Unlike the present preferred embodiment, the electronic component conveying tape 1 of the comparative example includes many fibers f parallel or substantially parallel to the length direction L in the fibers f included in the carrier tape 2.

In the comparative example, when the cover tape 3 is peeled from the carrier tape 2, the fibers f are pulled in a direction orthogonal or substantially orthogonal to the extending direction of the fibers themselves by the adhesive force of the cover tape 3.

Since the paper tends to be peeled off in a direction orthogonal or substantially orthogonal to the extending direction of the fibers f, there is a high possibility that the fibers f on the surface of the carrier tape 2 adhere to the surface of the cover tape 3 and are peeled off. In this case, the carrier tape 2 may be broken or deformed in some cases, which may cause problems in taking out the electronic components.

Figure 5:
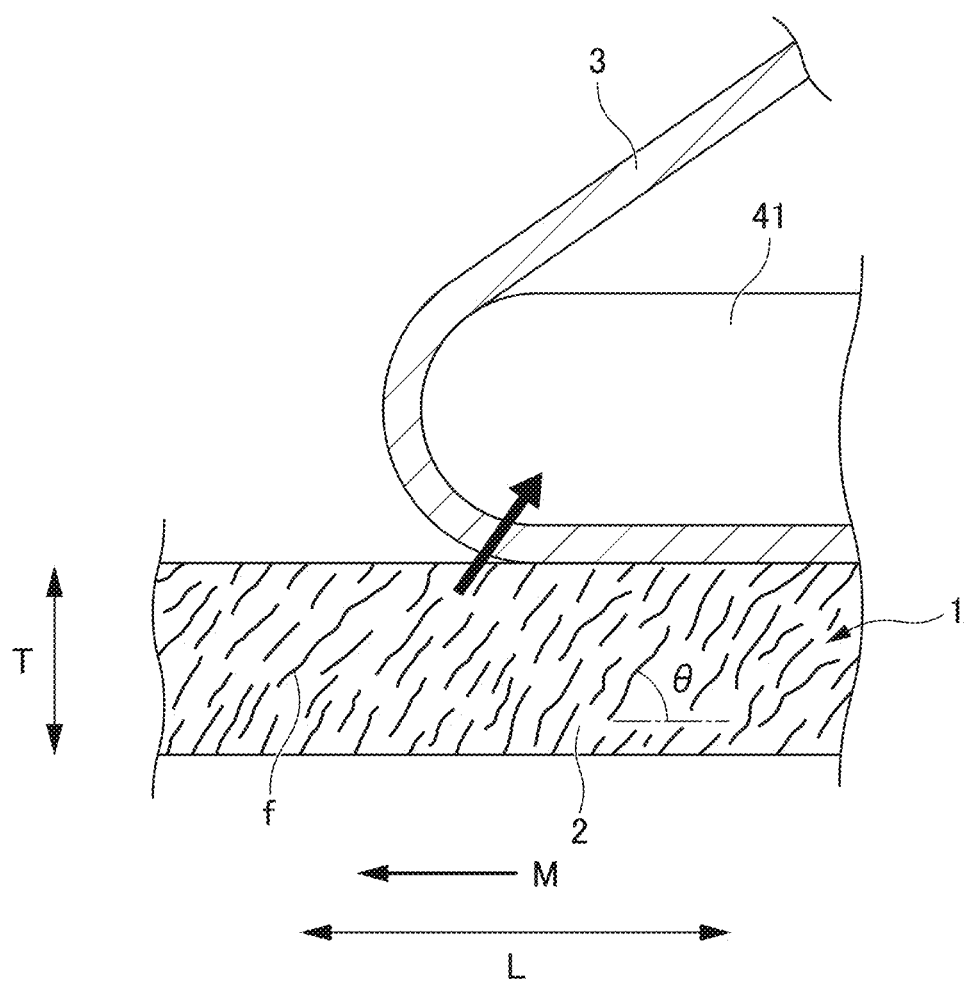
FIG. 5 is an enlarged view of the P portion of FIG. 3 according to a preferred embodiment of the present invention.

To the contrary, FIG. 5 shows an enlarged view of the P portion of FIG. 3 in the present preferred embodiment.

In the electronic component conveying tape 1 of the present preferred embodiment, many fibers f are sloped towards the thickness direction T with respect to the length direction L. These sloped fibers f are sloped at the thickness direction orientation degree θT such that the rear end side in the feeding direction M of the electronic component conveying tape 1 in the length direction L approaches the cover tape 3 of the carrier tape 2.

Therefore, when the cover tape 3 is peeled off from the carrier tape 2, the fibers f are pulled in the direction in which the fibers themselves extend by the adhesive force of the cover tape 3.

Since the paper is hardly peeled off in the extending direction of the fibers f, the possibility that the fibers f on the surface of the carrier tape 2 adhere to the surface of the cover tape 3 and peels off is reduced or prevented.

Therefore, it is possible to provide electronic component conveying tapes and electronic component conveying reels in each of which the adhesion of the fibers on the surface of the carrier tape 2 to the cover tape is reduced or prevented.

Width Direction Orientation Degree

Furthermore, in a plan view when viewing from a plane passing through the width direction W and the length direction L of the carrier tape 2, when the angle along the length direction L is defined as 0°, the slope toward the width direction W of the fibers f is defined as the width direction orientation degree θW. At this time, the fibers f in the carrier tape 2 include many fibers f sloped at the width direction orientation degree θW which is smaller than about 90°.

More specifically, in a plan view seen from the direction shown in FIG. 1, the fibers f having the width direction orientation degree θW in the width direction of, for example, about −60° to about 60° is about 70% or more of the entire fibers f. Furthermore, in a plan view seen from the direction shown in FIG. 1, the average of the width direction orientation degree θW of the entire fibers f is, for example, about −45° to about 45°.

Thus, in a plan view when viewed from a plane passing through the width direction W and the length direction L of the carrier tape 2, the fibers f in the present preferred embodiment include many fibers f sloped in the width direction W with respect to the length direction L. With such a configuration, when the cover tape 3 is peeled from the carrier tape 2, the force applied to the fibers f upon being peeled off is applied obliquely with respect to the extending direction of the fibers f, and the amount of the fibers f peeled off by the adhesive force of the cover tape 3 can be reduced or prevented.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. An electronic component conveying tape comprising:
   an elongated carrier tape including a plurality of recessed storage portions at regular intervals in a length direction, and each storing an electronic component; and
   an elongated cover tape attached to one surface in a thickness direction of the carrier tape to cover openings of the plurality of storage portions; wherein
   the carrier tape is made of paper, and fibers included in the carrier tape are sloped toward the thickness direction relative to the length direction.

2. The electronic component conveying tape according to claim 1, wherein, in a plan view seen from a plane passing through the thickness direction and the length direction, at least about 70% of all of the fibers are fibers having a thickness direction orientation degree of about 20° to about 70°, which is a slope towards the thickness direction relative to the length direction.

3. The electronic component conveying tape according to claim 1, wherein, in a plan view seen from a plane passing through the length direction and the thickness direction, an average of a thickness direction orientation degree, which is a slope toward the thickness direction relative to the length direction, for all of the fibers is about 0° to about 45°.

4. The electronic component conveying tape according to claim 1, wherein, in a plan view seen from a plane passing through the length direction and a width direction, at least about 70% of all of the fibers are fibers having a width direction orientation degree of about −60° to about 60°, which is a slope toward the width direction relative to the length direction.

5. The electronic component conveying tape according to claim 1, wherein in a plan view seen from a plane passing through the length direction and the width direction, an average of a width direction orientation degree, which is a slope toward the width direction relative to the length direction, for all of the fibers is about −45° to about 45°.

6. The electronic component conveying tape according to claim 1, wherein dimensions of the storage portions are each about 0.665±0.03 mm in the length direction, about 0.335±0.03 mm in the width direction, and about 0.335±0.03 mm in a depth direction.

7. The electronic component conveying tape according to claim 1, wherein each of the plurality of recessed storage portions has a rectangular or substantially rectangular shape in a plan view of the carrier tape.

8. The electronic component conveying tape according to claim 1, wherein the carrier tape includes feed holes in a line at regular intervals in the length direction.

9. The electronic component conveying tape according to claim 8, wherein each of the feed holes has a circular or substantially circular shape in in a plan view of the carrier tape.

10. The electronic component conveying tape according to claim 1, wherein the cover tape is made of a transparent resin.

11. An electronic component conveying reel comprising:
    a core material; and
    the electronic component conveying tape according to claim 1 wound around the core material; wherein
    the fibers provided in a vicinity of the cover tape in the thickness direction is sloped toward a side opposite to a side on which the electronic component conveying tape in the length direction is fed.

12. The electronic component conveying reel according to claim 11, wherein, in a plan view seen from a plane passing through the thickness direction and the length direction, at least about 70% of all of the fibers are fibers having a thickness direction orientation degree of about 20° to about 70°, which is a slope towards the thickness direction relative to the length direction.

13. The electronic component conveying reel according to claim 11, wherein, in a plan view seen from a plane passing through the length direction and the thickness direction, an average of a thickness direction orientation degree, which is a slope toward the thickness direction relative to the length direction, for all of the fibers is about 0° to about 45°.

14. The electronic component conveying reel according to claim 11, wherein, in a plan view seen from a plane passing through the length direction and a width direction, at least about 70% of all of the fibers are fibers having a width direction orientation degree of about −60° to about 60°, which is a slope toward the width direction relative to the length direction.

15. The electronic component conveying reel according to claim 11, wherein in a plan view seen from a plane passing through the length direction and the width direction, an average of a width direction orientation degree, which is a slope toward the width direction relative to the length direction, for all of the fibers is about −45° to about 45°.

16. The electronic component conveying reel according to claim 11, wherein dimensions of the storage portions are each about 0.665±0.03 mm in the length direction, about 0.335±0.03 mm in the width direction, and about 0.335±0.03 mm in a depth direction.

17. The electronic component conveying reel according to claim 11, wherein each of the plurality of recessed storage portions has a rectangular or substantially rectangular shape in a plan view of the carrier tape.

18. The electronic component conveying reel according to claim 11, wherein the carrier tape includes feed holes in a line at regular intervals in the length direction.

19. The electronic component conveying reel according to claim 18, wherein each of the feed holes has a circular or substantially circular shape in in a plan view of the carrier tape.

20. The electronic component conveying reel according to claim 11, wherein the cover tape is made of a transparent resin.

\* \* \* \* \*